United States Patent [19]

Sasaki et al.

[11] Patent Number: 5,508,364
[45] Date of Patent: Apr. 16, 1996

[54] PROCESS FOR POLYMERIZING ETHYLENE AT HIGH TEMPERATURE UNDER HIGH PRESSURE

[75] Inventors: Toshio Sasaki; Hirofumi Johoji, both of Ichihara; Hiroyuki Shiraishi; Kohzoh Miyazaki, both of Sodegaura; Toshimi Sato, Kisarazu; Yuji Shigematsu, Ichihara, all of Japan

[73] Assignee: Sumitomo Chemical Company, Limited, Osaka, Japan

[21] Appl. No.: 517,856

[22] Filed: Aug. 22, 1995

Related U.S. Application Data

[63] Continuation of Ser. No. 112,998, Aug. 30, 1993.

[30] Foreign Application Priority Data

Sep. 10, 1992 [JP] Japan ................... 4-241750

[51] Int. Cl.$^6$ ................................................. C08F 4/64
[52] U.S. Cl. ........................... 526/151; 526/148; 526/153; 526/161; 526/348; 526/348.3; 526/348.6; 526/351; 526/352
[58] Field of Search .................... 526/161, 163, 526/161, 148

[56] References Cited

U.S. PATENT DOCUMENTS

| 4,042,610 | 8/1977 | Manzer . | |
|---|---|---|---|
| 4,892,914 | 1/1990 | Hefner | 526/114 |
| 5,039,766 | 8/1991 | Sasari | 526/161 |
| 5,134,104 | 7/1992 | Sasaski | 502/103 |
| 5,258,476 | 11/1993 | Sasaski | 526/161 |

FOREIGN PATENT DOCUMENTS

| 0349886 | 1/1990 | European Pat. Off. . |
| 0571945 | 12/1993 | European Pat. Off. . |

OTHER PUBLICATIONS

*Patent Abstracts of Japan*, vol. 7, No. 91 (C–162), 15 Apr. 1983, & JP–A–58 021 407 (Sumitomo Chemical Co., Ltd.), 8 Feb. 1983.

*Primary Examiner*—Fred Zitomer
*Attorney, Agent, or Firm*—Watson Cole Stevens Davis

[57] ABSTRACT

A process for polymerizing ethylene at a high temperature under high pressure, which comprises contacting ethylene alone or along with an α-olefin at a temperature of 120° C. or more at a pressure of 350 kg/cm$^2$ or more with a catalyst consisting essentially of (A) a reaction product of (A1) a titanium compound having at least one titanium-nitrogen bond with (A2) an organometallic compound of an element of Groups I to III of the Periodic Table and (B) an organoaluminum compound. Said process enables the production of an ethylene polymer or copolymer having a narrow composition distribution and a high molecular weight and being excellent in weather resistance, color development, transparency, corrosiveness and mechanical properties.

12 Claims, No Drawings

PROCESS FOR POLYMERIZING ETHYLENE AT HIGH TEMPERATURE UNDER HIGH PRESSURE

This application is a continuation of application Ser. No. 08/112,998, filed Aug. 30, 1993.

BACKGROUND OF THE INVENTION

This invention relates to a process for polymerizing ethylene. More particularly, it relates to a process for polymerizing or copolymerizing ethylene with a novel Ziegler catalyst at a temperature of 120° C. or more at a pressure of 350 kg/cm² or more.

The technique of polymerizing or copolymerizing olefins in the molten state of the resulting polymer at a high temperature under high pressure in the absence of a solvent is called "high pressure ionic polymerization method" and is known.

The high pressure ionic polymerization method is known to be advantageous in that the reactor used is compact and the degree of freedom of selection of comonomer is great. It is also known that such high temperature polymerization is very advantageous in process because a large amount of heat of polymerization can be easily removed during the polymerization and the molten polymer can be utilized as it is in pelletization after the polymerization.

The olefin copolymers obtained by the above polymerization method are used in very many fields such as film, laminate, wire-coating, injection molded article, special molded articles and the like. It is commonly known that in order to obtain products excellent in transparency, impact resistance, blocking properties and the like in each of these uses, the use of polymers having a narrow molecular weight distribution and a narrow composition distribution is beneficial. In particular, in the case of copolymer, as the content of α-olefin copolymerized is increased the molecular weight distribution and composition distribution affect more greatly the physical properties of the olefin copolymer, and hence, olefin copolymers having a narrow molecular weight distribution and a narrow composition distribution have been desired.

As to Ziegler type solid catalysts for use at high temperatures, various improvements have been made (for example, Japanese Patent Application Kokai Nos. 51-144,397; 54-52,192; 56-18,607; 56-99,209; 57-87,405; 57-153,007; 57-190,009 and 58-203,303); however, the copolymers thus improved have a broad composition distribution and are not satisfactory in transparency and mechanical properties.

SUMMARY OF THE INVENTION

An object of this invention is to provide a process for producing an ethylene polymer or ethylene-α-olefin copolymer having a narrow composition distribution and a high molecular weight and being excellent in weather resistance, color development, transparency, corrosiveness and mechanical properties, particularly in transparency, using a novel Ziegler catalyst.

Another object of this invention is to provide a process for polymerizing or copolymerizing ethylene at a high temperature under high pressure with a novel Ziegler catalyst.

Other objects and advantages of this invention will become apparent from the following description.

According to this invention, there is provided a process for polymerizing ethylene at a high temperature under high pressure, which comprises contacting ethylene alone or along with an α-olefin with a catalyst consisting of (A) a reaction product of (A1) a titanium compound having at least one titanium-nitrogen bond with (A2) an organometallic compound of an element of Groups I to III of the Periodic Table and (B) an organoaluminum compound at a temperature of 120° C. or more at a pressure of 350 kg/cm² or more.

DETAILED DESCRIPTION OF THE INVENTION

The titanium compound (A1) used in this invention is a titanium compound having at least one titanium-nitrogen bond. This titanium compound includes, for example, titanium compounds represented by the general formula $(R^1R^2N)_{4-(m+n)}TiX_mY_n$ ($R^1$ and $R^2$ represent hydrocarbon groups having 1 to 30 carbon atoms and may be the same or different; X represents a halogen atom; Y represents an alkoxy group; m represents a number satisfying $0 \leq m \leq 3$; n represents a number satisfying $0 \leq n \leq 3$: and (m+n) represents a value satisfying $0 \leq (m+n) \leq 3$.

The halogen atom for X in the above general formula includes chlorine, bromine, iodine and the like, and is preferably chlorine from the viewpoint of catalyst activity. The alkoxy group for Y in the above general formula is preferably an alkoxy group having 1 to 20 carbon atoms such as methoxy, ethoxy, propoxy, butoxy, 2-ethylhexyloxy and the like. However, the number of carbon atoms is not critical for catalyst performance.

When the value of (m+n) in the above general formula is more than 3, it follows that free $TiCl_4$ exists and the resulting copolymer has a broad composition distribution. This is not desirable.

Specific examples of such titanium compounds include dimethylaminotitanium trichloride, bis(dimethylamino)titanium dichloride, tris(dimethylamino)titanium chloride, tetrakis(dimethylamino)titanium, diethylaminotitanium trichloride, bis(diethylamino)titanium dichloride, tris(diethylamino)titanium chloride, tetrakis(diethylamino)titanium, diisopropylaminotitanium trichloride, bis(diisopropylamino)titanium dichloride, tris(diisopropylamino)titanium chloride, tetrakis(diisopropylamino)titanium, dipropylaminotitanium trichloride, bis(dipropylamino)titanium dichloride, tris(dipropylamino)titanium chloride, tetrakis(dipropylamino)titanium, diisobutylaminotitanium trichloride, bis(diisobutylamino)titanium dichloride, tris(diisobutylamino)titanium chloride, tetrakis(diisobutylamino)titanium, di-tert-butylaminotitanium trichloride, bis(di-tert-butylamino)titanium dichloride, tris(di-tert-butylamino)titanium chloride, tetrakis(di-tert-butylamino)titanium, dibutylaminotitanium trichloride, bis(dibutylamino)titanium dichloride, tris(dibutylamino)titanium chloride, tetrakis(dibutylamino)titanium, dihexylaminotitanium trichloride, bis(dihexylamino)titanium dichloride, tris(dihexylamino)titanium chloride, tetrakis(dihexylamino)titanium, dioctylaminotitanium trichloride, bis(dioctylamino)titanium dichloride, tris(dioctylamino)titanium chloride, tetrakis(dioctylamino)titanium, didecylaminotitanium trichloride, bis(didecylamino)titanium dichloride, tris(didecylamino)titanium chloride, tetrakis(didecylamino)titanium, dioctadecylaminotitanium trichloride, bis(dioctadecylamino)titanium dichloride, tris(dioctadecylamino)titanium chloride, tetrakis(dioctadecylamino)titanium, diphenylaminotitanium trichloride, bis(diphenylamino)titanium dichloride, tris(diphenylamino)titanium chloride, tetrakis(diphenylamino)titanium, ethoxy(dimethylamino)titanium dichloride, ethoxy(diethylamino)titanium dichloride, ethoxy(dipropylamino)titanium dichloride, ethoxy(diisopropylamino)titanium dichloride, ethoxy(diisobutylamino)titanium dichloride, ethoxy(di-tert-butylamino)titanium dichloride, ethoxy(dibutylamino)titanium dichloride, ethoxy(dihexylamino)titanium dichloride, ethoxy(dioctylamino)titanium dichloride, ethoxy(diphenylamino)titanium dichloride, propoxy(dimethylamino)titanium dichloride, propoxy(diethylamino)titanium dichloride, propoxy(dipropylamino)titanium dichloride, propoxy(diisopropylamino)titanium dichloride, propoxy(diisobutylamino)titanium dichloride, propoxy(di-tert-butylamino)titanium dichloride, propoxy(dibutylamino)titanium dichloride, propoxy(dihexylamino)titanium dichloride, propoxy(dioctylamino)titanium dichloride, propoxy(diphenylamino)titanium dichloride, butoxy(dimethylamino)titanium dichloride, butoxy(diethylamino)titanium dichloride, butoxy(dipropylamino)titanium dichloride, butoxy(diisopropylamino)titanium dichloride, butoxy(diisobutylamino)titanium dichloride, butoxy(di-tert-butylamino)titanium dichloride, butoxy(dibutylamino)titanium dichloride, butoxy(dihexylamino)titanium dichloride, butoxy(dioctylamino)titanium dichloride, butoxy(diphenylamino)titanium dichloride, hexyloxy(dioctylamino)titanium dichloride, 2-ethylhexyloxy(dioctylamino)titanium dichloride, decyloxy(dioctylamino)titanium dichloride, ethoxy(didecylamino)titanium dichloride, hexyloxy(didecylamino)titanium dichloride, 2-ethylhexyloxy(didecylamino)titanium dichloride, decyloxy(didecylamino)titanium dichloride, ethoxy(dioctadecylamino)titanium dichloride, 2ethylhexyloxy(dioctadecylamino)titanium dichloride, decyloxy(dioctadecylamino)titanium dichloride, hexyloxybis(dioctylamino)titanium chloride, 2-ethylhexyloxybis(dioctylamino)titanium chloride, decyloxybis(dioctylamino)titanium chloride, hexyloxybis(didecylamino)titanium chloride, 2-ethylhexyloxy(didecylamino)titanium chloride, decyloxybis(didecylamino)titanium chloride, hexyloxybis(dioctadecylamino)titanium chloride, 2-ethylhexyloxybis(dioctadecylamino)titanium chloride, decyloxybis(dioctadecylamino)titanium chloride, methoxytris(dimethylamino)titanium, ethoxytris(dimethylamino)titanium, butoxytris(dimethylamino)titanium, hexyloxytris(dimethylamino)titanium, 2-ethylhexyloxytris(dimethylamino)titanium, decyloxytris(dimethylamino)titanium, methoxytris(diethylamino)titanium, ethoxytris(diethylamino)titanium, butoxytris(diethylamino)titanium, hexyloxytris(diethylamino)titanium, 2-ethylhexyloxytris(diethylamino)titanium, decyloxytris(diethylamino)titanium, methoxytris(dipropylamino)titanium, ethoxytris(dipropylamino)titanium, butoxytris(dipropylamino)titanium, hexyloxytris(dipropylamino)titanium, 2-ethylhexyloxytris(dipropylamino)titanium, decyloxytris(dipropylamino)titanium, methoxytris(dibutylamino)titanium, ethoxytris(dibutylamino)titanium, butoxytris(dibutylamino)titanium, hexyloxytris(dibutylamino)titanium, 2-ethylhexyloxytris(dibutylamino)titanium, decyloxytris(dibutylamino)titanium, methoxytris(dihexylamino)titanium, ethoxytris(dihexylamino)titanium, butoxytris(dihexylamino)titanium, hexyloxytris(dihexylamino)titanium, 2-ethylhexyloxytris(dihexylamino)titanium, decyloxytris(dihexylamino)titanium, methoxytris(diphenylamino)titanium, ethoxytris(diphenylamino)titanium, butoxytris(diphenylamino)titanium, hexyloxytris(diphenylamino)titanium, 2-ethylhexyloxytris(diphenylamino)titanium, decyloxytris(diphenylamino)titanium, methoxytris(dioctylamino)titanium, ethoxytris(dioctylamino)titanium, butoxytris(dioctylamino)titanium, hexyloxytris(dioctylamino)titanium, 2-ethylhexyloxytris(dioctylamino)titanium, decyloxytris(dioctylamino)titanium, methoxytris(didecylamino)titanium, ethoxytris(didecylamino)titanium, butoxytris(didecylamino)titanium, hexyloxytris(didecylamino)titanium, 2-ethylhexyloxytris(didecylamino)titanium, decyloxytris(didecylamino)titanium, methoxytris(dioctadecylamino)titanium, ethoxytris(dioctadecylamino)titanium, butoxytris(dioctadecylamino)titanium, hexyloxytris(dioctadecylamino)titanium, 2-ethylhexyloxytris(dioctdecylamino)titanium, decyloxytris(dioctadecylamino)titanium, and the like.

Among such titanium compounds, those in which $R^1$ and $R^2$ are aliphatic hydrocarbon groups are preferred for obtaining a narrow composition distribution. Specific examples of these titanium compounds include dimethylaminotitanium trichloride, bis(dimethylamino)titanium dichloride, tris(dimethylamino)titanium chloride, tetrakis(dimethylamino)titanium, diethylaminotitanium trichloride, bis(diethylamino)titanium dichloride, tris(diethylamino)titanium chloride, tetrakis(diethylamino)titanium, diisopropylaminotitanium trichloride, bis(diisopropylamino)titanium dichloride, tris(diisopropylamino)titanium chloride, tetrakis(diisopropylamino)titanium, dipropylaminotitanium trichloride, bis(dipropylamino)titanium dichloride, tris(dipropylamino)titanium chloride, tetrakis(dipropylamino)titanium, diisobutylaminotitanium trichloride, bis(diisobutylamino)titanium dichloride, tris(diisobutylamino)titanium chloride, tetrakis(diisobutylamino)titanium, di-tert-butylaminotitanium trichloride, bis(di-tert-butylamino)titanium dichloride, tris(di-tert-butylamino)titanium chloride, tetrakis(di-tert-butylamino)titanium, dibutylaminotitanium trichloride, bis(dibutylamino)titanium dichloride, tris(dibutylamino)titanium chloride, tetrakis(dibutylamino)titanium, dihexylaminotitanium trichloride, bis(dihexylamino)titanium dichloride, tris(dihexylamino)titanium chloride, tetrakis(dihexylamino)titanium, dioctylaminotitanium trichloride, bis(dioctylamino)titanium dichloride, tris(dioctylamino)titanium chloride, tetrakis(dioctylamino)titanium, didecylaminotitanium trichloride, bis(didecylamino)titanium dichloride, tris(didecylamino)titanium chloride, tetrakis(didecylamino)titanium, dioctadecylaminotitanium trichloride, bis(dioctadecylamino)titanium dichloride, tris(dioctadecylamino)titanium chloride, tetrakis(dioctadecylamino)titanium, ethoxy(dimethylamino)titanium dichloride, ethoxy(diethylamino)titanium dichloride, ethoxy(dipropylamino)titanium dichloride, ethoxy(diisopropylamino)titanium dichloride, ethoxy(diisobutylamino)titanium dichloride, ethoxy(di-tert-butylamino)titanium dichloride, ethoxy(dibutylamino)titanium dichloride, ethoxy(dihexylamino)titanium dichloride, ethoxy(dioctylamino)titanium dichloride, propoxy(dimethylamino)titanium dichloride, propoxy(diethylamino)titanium dichloride, propoxy(dipropylamino)titanium dichloride, propoxy(diisopropylamino)titanium dichloride, propoxy(diisobutylamino)titanium dichloride, propoxy(di-tert-butylamino)titanium dichloride, propoxy(dibutylamino)titanium dichloride, propoxy(dihexylamino)titanium dichloride, propoxy(dioctylamino)titanium dichloride, butoxy(dimethylamino)titanium dichloride, butoxy(diethylamino)titanium dichloride, butoxy (dipropylamino)titanium dichloride butoxy(diisopropylamino)titanium dichloride, butoxy(diisobutylamino)titanium dichloride, butoxy(di-tert-butylamino)titanium dichloride, butoxy(dibutylamino)titanium dichloride, butoxy(dihexylamino)titanium dichloride, butoxy(dioctylamino)titanium dichloride, hexyloxy(dioctylamino)titanium dichloride, 2-ethylhexyloxy(dioctylamino)titanium dichloride, decyloxy(dioctylamino)titanium dichloride, ethoxy(didecylamino)titanium dichloride, hexyloxy(didecylamino)titanium dichloride, 2-ethylhexyloxy-(didecylamino)titanium dichloride, decyloxy(didecylamino)titanium dichloride, ethoxy(dioctadecylamino)titanium dichloride, 2-ethylhexyloxy(dioctadecylamino)titanium dichloride, decyloxy(dioctadecylamino)titanium dichloride, hexyloxybis(dioctylamino)titanium chloride, 2-ethylhexyloxybis(dioctylamino)titanium chloride, decyloxybis(dioctylamino)titanium chloride, hexyloxybis(didecylamino)titanium chloride, 2-ethylhexyloxybis(didecylamino)titanium chloride, decyloxy(didecylamino)titanium chloride, hexyloxybis(dioctadecylamino)titanium chloride, 2-ethylhexyloxybis(dioctadecylamino)titanium chloride, decyloxybis-(dioctadecylamino)titanium chloride, methoxytris(dimethylamino)titanium, ethoxytris(dimethylamino)titanium, butoxytris(dimethylamino)titanium, hexyloxy-tris(dimethylamino)titanium, 2-ethylhexyloxytris(dimethylamino)titanium, decyloxytris(dimethylamino)titanium, methoxytris(diethylamino)titanium, ethoxytris(diethylamino)titanium, butoxytris(diethylamino)titanium, hexyloxytris(diethylamino)titanium, 2-ethylhexyloxytris(diethylamino)titanium, decyloxytris(diethylamino)titanium, methoxytris(dipropylamino)titanium, ethoxytris(dipropylamino)titanium, butoxytris(dipropylamino)titanium, hexyloxytris(dipropylamino)titanium, 2-ethylhexyloxytris(dipropylamino)titanium, decyloxytris(dipropylamino)titanium, methoxytris(dibutylamino)titanium, ethoxytris(dibutylamino)titanium, butoxytris(dibutylamino)titanium, hexyloxytris(dibutylamino)titanium, 2-ethylhexyloxytris(dibutylamino)titanium, decyloxytris(dibutylamino)titanium, methoxytris(dihexylamino)titanium, ethoxytris(dihexylamino)titanium, butoxytris(dihexylamino)titanium, hexyloxytris(dihexylamino)titanium, 2-ethylhexyloxytris(dihexylamino)titanium, decyloxytris(dihexylamino)titanium, methoxytris(dioctylamino)titanium, ethoxytris(dioctylamino)titanium, butoxytris(dioctylamino)titanium, hexyloxytris(dioctylamino)titanium, 2-ethylhexyloxytris(dioctylamino)titanium, decyloxytris(dioctylamino)titanium, methoxytris(didecylamino)titanium, ethoxytris(didecylamino)titanium, butoxytris(didecylamino)titanium, hexyloxytris(didecylamino)titanium, 2-ethylhexyloxytris(didecylamino)titanium, decyloxytris(didecylamino)titanium, methoxytris(dioctadecylamino)titanium, ethoxytris(dioctadecylamino)titanium, butoxytris(dioctadecylamino)titanium, hexyloxytris(dioctadecylamino)titanium, 2-ethylhexyloxytris(dioctadecylamino)titanium, decyloxytris(dioctadecylamino)titanium, and the like.

Further, among said titanium compounds, those in which $R^1$ and $R^2$ are aliphatic hydrocarbon groups having 8 to 30 carbon atoms are particularly preferable. Even when $R^1$ and $R^2$ have less than 8 carbon atoms, the case where m is 0 or 2 is more preferable because the composition distribution becomes narrow. Such compounds include, for example, bis(dimethylamino)titanium dichloride, tetrakis(dimethylamino)titanium, bis(diethylamino)titanium dichloride, tetrakis(diethylamino)titanium, bis(diisopropylamino)titanium dichloride, tetrakis(diisopropylamino)titanium, bis(dipropylamino)titanium dichloride, tetrakis(dipropylamino)titanium, bis(diisobutylamino)titanium dichloride, tetrakis(diisobutylamino)titanium, bis(di-tert-butylamino)titanium dichloride, tetrakis(di-tert-butylamino)titanium, bis(dibutylamino)titanium dichloride, tetrakis(dibutylamino)titanium, bis(dihexylamino)titanium dichloride, tetrakis(dihexylamino)titanium, dioctylaminotitanium trichloride, bis(dioctylamino)titanium dichloride, tris(dioctylamino)titanium chloride, tetrakis(dioctylamino)titanium, didecylaminotitanium trichloride, bis(didecylamino)titanium dichloride, tris(didecylamino)titanium chloride, tetrakis(didecylamino)titanium, dioctadecylaminotitanium trichloride, bis(dioctadecylamino)titanium dichloride, tris(dioctadecylamino)titanium chloride, tetrakis(dioctadecylamino)titanium, ethoxy(dimethylamino)titanium dichloride, ethoxy(diethylamino)titanium dichloride, ethoxy(dipropylamino)titanium dichloride, ethoxy(diisopropylamino)titanium dichloride, ethoxy(diisobutylamino)titanium dichloride, ethoxy(di-tert-butylamino)titanium dichloride, ethoxy(dibutylamino)titanium dichloride, ethoxy(dihexylamino)titanium dichloride, ethoxy(dioctylamino)titanium dichloride, propoxy(dimethylamino)titanium dichloride, propoxy(diethylamino)titanium dichloride, propoxy(dipropylamino)titanium dichloride, propoxy(diisopropylamino)titanium dichloride, propoxy(diisobutylamino)titanium dichloride, propoxy(di-tert-butylamino)titanium dichloride, propoxy(dibutylamino)titanium dichloride, propoxy(dihexylamino)titanium dichloride, propoxy(dioctylamino)titanium dichloride, butoxy(dimethylamino)titanium dichloride, butoxy(diethylamino)titanium dichloride, butoxy(dipropylamino)titanium dichloride, butoxy(diisopropylamino)titanium dichloride, butoxy(diisobutylamino)titanium dichloride, butoxy(di-tert-butylamino)titanium dichloride, butoxy(dibutylamino)titanium dichloride, butoxy(dihexylamino)titanium dichloride, butoxy(dioctylamino)titanium dichloride, hexyloxy(dioctylamino)titanium dichloride, 2-ethylhexyloxy(dioctylamino)titanium dichloride, decyloxy(dioctylamino)titanium dichloride, ethoxy(didecylamino)titanium dichloride, hexyloxy(didecylamino)titanium dichloride, 2-ethylhexyloxy-(didecylamino)titanium dichloride, decyloxy(didecylamino)titanium dichloride, ethoxy(dioctadecylamino)titanium dichloride, 2-ethylhexyloxy(dioctadecylamino)titanium dichloride, decyloxy(dioctadecylamino)titanium dichloride, hexyloxybis(dioctylamino)titanium chloride, 2-ethylhexyloxybis(dioctylamino)titanium chloride, decyloxybis(dioctylamino)titanium chloride, hexyloxybis(didecylamino)titanium chloride, 2-ethylhexyloxybis(didecylamino)titanium chloride, decyloxy (didecylamino)titanium chloride, hexyloxybis(dioctadecylamino)titanium chloride, 2-ethylhexyloxybis(dioctadecylamino)titanium chloride, decyloxybis-(dioctadecylamino)titanium chloride, methoxytris(dimethylamino)titanium, ethoxytris(dimethylamino)titanium, butoxytris(dimethylamino)titanium, hexyloxytris(dimethylamino)titanium, 2-ethylhexyloxytris(dimethylamino)titanium, decyloxytris(dimethylamino)titanium, methoxytris(diethylamino)titanium, ethoxytris(diethylamino)titanium, butoxytris(diethylamino)titanium, hexyloxytris(diethylamino)titanium, 2-ethylhexyloxytris(diethylamino)titanium, decyloxytris(diethylamino)titanium, methoxytris(dipropylamino)titanium, ethoxytris(dipropylamino)titanium, butoxytris(dipropylamino)titanium, hexyloxytris(dipropylamino)titanium, 2-ethylhexyloxytris(dipropylamino)titanium, decyloxytris(dipropylamino)titanium, methoxytris(dibutylamino)titanium, ethoxytris(dibutylamino)titanium, butoxytris(dibutylamino)titanium, hexyloxytris(dibutylamino)titanium, 2-ethylhexyloxytris(dibutylamino)titanium, decyloxytris(dibutylamino)titanium, methoxytris(dihexylamino)titanium, ethoxytris(dihexylamino)titanium, butoxytris(dihexylamino)titanium, hexyloxytris(dihexylamino)titanium, 2-ethylhexyloxytris(dihexylamino)titanium, decyloxytris(dihexylamino)titanium, methoxytris(dioctylamino)titanium, ethoxytris(dioctylamino)titanium, butoxytris(dioctylamino)titanium, hexyloxytris(dioctylamino)titanium, 2-ethylhexyloxytris(dioctylamino)titanium, decyloxytris(dioctylamino)titanium, methoxytris(didecylamino)titanium, ethoxytris(didecylamino)titanium, butoxytris(didecylamino)titanium, hexyloxytris(didecylamino)titanium, 2-ethylhexyloxytris(didecylamino)titanium, decyloxytris(didecylamino)titanium, methoxytris(dioctadecylmaino)titanium, ethoxytris(dioctadecylamino)titanium, butoxytris(dioctadecylamino)titanium, hexyloxytris(dioctadecylamino)titanium, 2-ethyhexyloxytris(dioctadecylamino)titanium, decyloxytris(dioctadecylamino)titanium, and the like.

Such titanium compounds (A1) can be synthesized according to the method described in, for example, Japanese Patent Kokoku Nos. 41-5,397 and 42- 11,646, H. Burger et al., J. of Organomet. Chem. 108 (1976), 69–84, H. Burger et al., J of Organomet. Chem., 20 (1969), 129–139, H. Burger, Z. Anorg. Allg. Chem., 365, 243–254 ('91) and the like.

The titanium compound can be synthesized according to the above methods, for example, by reacting (i) a secondary amine compound represented by the general formula $R^7R^8NH$ in which $R^7$ and $R^8$ represent hydrocarbon groups having 1 to 30 carbon atoms and may be the same or different, with (ii) an alkali metal alkyl represented by the general formula $R^9M$ in which $R^9$ represents a hydrocarbon group having 1 to 30 carbon atoms and M represents an alkali metal such as Li, K or the like, to synthesize an alkali metal amide compound, and then reacting this alkali metal amide compound with (iii) a titanium tetrahalide represented by the general formula $TiX_4$ in which X represents a halogen atom such as chlorine, bromine, iodine or the like, preferably chlorine. In this case, the alkali metal alkyl (ii) may be used in combination of two or more.

The organometallic compound (A2) of an element of Groups I to III of the Periodic Table to be used in the synthesis of the reaction product (A) in this invention includes organometallic compounds represented by the general formula $MeR^4_m Z^2_n$ in which Me represents an element of Groups I to III of the Periodic Table, $R^4$ represents a hydrocarbon group having 1 to 20 carbon atoms, $Z^2$ represents a halogen atom, a hydrogen atom or an alkoxy group, m is a number satisfying $0 < m \leq 3$, n is a number satisfying $0 \leq n < 3$, and m+n is an integer corresponding to the valency of Me, and chain-like or cyclic aluminoxanes having a structure represented by the general formula $—[Al(R^5)O]_p—$ in which $R^5$ represents a hydrocarbon group having 1 to 20 carbon atoms, p represents an integer of 1 or more, preferably 2 to 30. Specific examples of Me include Li, Na, K, Be, Mg, Ca, Zn, Cd, B, Al, Ga and In. The organometallic compounds of these metals may be used alone or in admixture of two or more.

Specific examples of $R^4$ include alkyl groups having 1 to 20 carbon atoms, cycloalkyl groups, aryl groups, aralkyl groups and alkenyl groups such as methyl, ethyl, propyl, isopropyl, butyl, sec-butyl, tert-butyl, amyl, isoamyl, hexyl, octyl, 2-ethylhexyl, cyclohexyl, phenyl, benzyl, vinyl, 1-propenyl, 2-propenyl and the like. It is possible to use organometallic compounds having two or more different $R^4$ groups.

The metal Me of the organometallic compounds is preferably Li, Na, K, Mg or Al.

The organometallic compound in which Me is Li includes, for example, organolithium compounds such as methyllithium, ethyllithium, propyllithium, isopropyllithium, butyllithium, isobutyllithium, sec-butyllithium, tert-butyllithium, amyllithium, neopentyllithium, hexyllithium, cyclohexyllithium, phenyllithium, benzyllithium, vinyllithium, 2-propenyllithium, 2-butenyllithium, trimethylsilylmethyllithium and the like. The organometallic compound in which Me is Na includes, for example, organosodium compounds such as methylsodium, ethylsodium, propylsodium, isopropylsodium, butylsodium, isobutylsodium, sec-butylsodium, tert-butylsodium, amylsodium, neopentylsodium, hexylsodium, cyclohexylsodium, phenylsodium, benzylsodium, vinylsodium, 2-propenylsodium, 2-butenylsodium, trimethylsilylsodium and the like. 1 The organometallic compound in which Me is K includes organopotassium compound such as methylpotassium, ethylpotassium, propylpotassium, isopropylpotassium, butylpotassium, isobutylpotassium, sec-butylpotassium, tert-butylpotassium, amylpotassium, neopentylpotassium, hexylpotassium, cyclohexylpotassium, phenylpotassium, benzylpotassium, vinylpotassium, 2-propenylpotassium, 2-butenylpotassium, trimethylsilylmethylpotassium and the like.

The organometallic compound in which Me is Mg includes organomagnesium compounds such as dimethylmagnesium, diethylmagensium, dipropylmagensium, diisopropylmagensium, dibutylmagnesium, diisobutylmagnesium, di-sec-butylmagnesium, di-tert-butylmagnesium, diamylmagnesium, dineopentylmagnesium, dihexylmagnesium, dicyclohexylmagnesium, diphenylmagnesium, dibenzylmagnesium, divinylmagnesium, di-2-propenylmagnesium, di-2-butenylmagnesium, bis(trimethylsilylmethyl)magnesium, methylethylmagnesium, methylpropylmagnesium, methylisopropylmagnesium, methylbutylmagnesium, methylisobutylmagnesium, methyl-sec-butylmagnesium, methyl-tert-butylmagnesium, methylamylmagnesium, methylneopentylmagnesium, methylhexylmagnesium, methylcyclohexylmagnesium, methylphenylmagnesium, methylbenzylmagnesium, methylvinylmagnesium, methyl-2-propenylmagnesium, methyl-2-butenylmagnesium, methyl(trimethylsilylmethyl)magnesium, ethylpropylmagnesium, ethylisoropylmagnesium, ethylbutylmagnesium, ethylisobutylmagnesium, ethyl-sec-butylmagnesium, ethyl-tert-butylmagnesium, ethylamylmagnesium, ethylneopentylmagnesium, ethylhexylmagnesium, ethylcyclohexylmagnesium, ethylphenylmagnesium, ethylbenzylmagnesium, ethylvinylmagnesium, ethyl-2-propenylmagnesium, ethyl-2-butenylmagnesium, ethyl(trimethylsilylmethyl)magnesium, propylisopropylmagnesium, propylbutylmagnesium, propylisobutylmagnesium, propyl-sec-butylmagnesium, propyl-tert-butylmagnesium, propylamylmagnesium, propylneopentylmagnesium, propylhexylmagnesium, propylcyclohexylmagnesium, propylphenylmagnesium, propylbenzylmagnesium, propylvinylmagnesium, propyl-2-propenylmagnesium, propyl-2-butenylmagnesium, propyl(trimethylsilylmethyl)magensium, isopropylbutylmagnesium, isopropylisobutylmagnesium, isopropyl-sec-butylmagnesium, isopropyl-tert-butylmagnesium, isopropylamylmagnesium, isopropylneopentylmagnesium, isopropylhexylmagnesium, isopropylcyclohexylmagnesium, isopropylphenylmagnesium, isopropylbenzylmagnesium, isopropyvinylmagensium, isopropyl-2-propenylmagnesium, isopropyl-2-butenylmagensium, isopropyl(trimethylsilylmethyl)magnesium, butylisobutylmagnesium, butyl-sec-butylmagnesium, butyl-tert-butylmagnesium, butylamylmagnesium, butylneopentylmagnesium, butylhexylmagnesium, butylcyclohexylmagnesium, butylphenylmagnesium, butylbenzylmagnesium, butylvinylmagnesium, butyl-2-propenylmagnesium, butyl-2-butenylmagnesium, butyl(trimethylsilylmethyl)magnesium, isobutyl-sec-butylmagnesium, isobutyl-tert-butylmagnesium, isobutylamylmagnesium, isobutylneopentylmagnesium, isobutylhexylmagnesium, isobutylcyclohexylmagnesium, isobutylphenylmagnesium, isobutylbenzylmagnesium, isobutylvinylmagnesium, isobutyl-2-propenylmagnesium, isobutyl-2-butenylmagensium, isobutyl(trimethylsilylmethyl)magnesium, sec-butyl-tert-butylmagnesium, sec-butylamylmagnesium, sec-butylneopentylmagnesium, sec-butylhexylmagnesium, sec-butylcyclohexylmagnesium, sec-butylphenylmagnesium, sec-butylbenzylmagnesium, sec-butylvinylmagnesium, sec-butyl-2-propenylmagnesium, sec-butyl-2-butenylmagnesium, sec-butyl(trimethylsilylmethyl)magnesium, tert-butylamylmagnesium, tert-butylneopentylmagnesium, tert-butylhexylmagnesium, tert-butylcyclohexylmagnesium, tert-butylphenylmagnesium, tert-butylbenzylmagnesium, tert-butylvinylmagnesium, tert-butyl-2-propenylmagnesium, tert-butyl-2-butenylmagensium, tert-butyl(trimethylsilylmethyl)magnesium, amylneopentylmagnesium, amylhexylmagnesium, amylcyclohexylmagnesium, amylphenylmagnesium, amylbenzylmagnesium amylvinylmagnesium, amyl-2-propenylmagnesium, amyl-2-butenylmagnesium, amyl(trimethylsilylmethyl)magnesium, neopentylhexylmagnesium, neopentylcyclohexylmagnesium, neopentylphenylmagnesium, neopentylbenzylmagnesium, neopentylvinylmagnesium, neopentyl-2-propenylmagnesium, neopentyl-2-butenylmagnesium, neopentyl(trimethylsilylmethyl)magnesium, hexylcyclohexylmagnesium, hexylphenylmagnesium, hexylbenzylmagnesium, hexylvinylmagnesium, hexyl-2-propenylmagnesium, hexyl-2-butenylmagnesium, hexyl(trimethylsilylmethyl)magnesium, cyclohexylphenylmagnesium, cyclohexylbenzylmagnesium, cyclohexylvinylmagnesium, cyclohexyl-2-propenylmagnesium, cyclohexyl-2-butenylmagnesium, cyclohexyl(trimethylsilylmethyl)magensium, phenylbenzylmagnesium, phenylvinylmagnesium, phenyl-2-propenylmangesium, phenyl-2-butenylmagnesium, phenyl(trimethylsilylmethyl)magnesium, benzylvinylmagnesium, benzyl-2-propenylmagnesium, benzyl-2-butenylmagnesium, benzyl(trimethylsilylmethyl)magnesium, vinyl-2-propenylmagnesium, vinyl- 2-butenylmagnesium, vinyl(tri-methylsilylmethyl)magnesium, ethylmagensium hydride, propylmagnesium hydride, isopropylmagnesium hydride, butylmagnesium hydride, sec-butylmagnesium hydride, tert-butylmagnesium hydride, phenylmagnesium hydride, ethylmagnesium hydride, ethylmagnesium ethoxide, ethylmagnesium propoxide, ethylmagensium butoxide, ethylmagnesium phenoxide, propylmagnesium methoxide, propylmagensium ethoxide, propylmagnesium propoxide, propylmagnesium butoxide, propylmagnesium phenoxide, isopropylmagnesium methoxide, isopropylmagnesium ethoxide, isopropylmagnesium propoxide, isopropylmagnesium butoxide, isopropylmagnesium phenoxide, butylmagnesium methoxide, butylmagnesium ethoxide, butylmagnesium propoxide, butylmagnesium butoxide, butylmagnesium phenoxide, sec-butylmagnesium methoxide, sec-butylmagnesium ethoxide, sec-butylmagnesium propoxide, sec-butylmagnesium butoxide, sec-butylmagnesium phenoxide, tert-butylmagnesium methoxide, tert-butylmagnesium ethoxide, tert-butylmagnesium propoxide, tert-butylmagnesium butoxide, tert-butylmagnesium phenoxide, phenylmagnesium methoxide, phenylmagnesium ethoxide, phenylmagnesium propoxide, phenylmagnesium butoxide, phenylmagnesium phenoxide, methylmagnesium chloride, ethylmagnesium chloride, ethylmagnesium, bromide, ethylmagnesium iodide, propylmagnesium chloride, propylmagnesium bromide, butylmagnesium chloride, butylmagnesium bromide, sec-butylmagnesium chloride, sec-butylmagnesium bromide, tert-butylmagnesium chloride, tert-butylmagnesium bromide, amylmagnesium chloride, isoamylmagnesium chloride, vinylmagnesium bromide, vinylmagnesium chloride, 1-propenylmagnesium bromide, 1-propenylmagnesium chloride, 2-propenylmagnesium bromide, 2-propenylmagnesium chloride, phenylmagnesium chloride, phenylmagnesium bromide, benzylmagnesium chloride, benzylmagnesium bromide and the like.

From the viewpoint of the composition distribution of the copolymer obtained, dialkylmagnesium compounds are preferred, and specific examples thereof include dimethylmagnesium, diethylmagensium, dipropylmagensium, diisopropylmagensium, dibutylmagnesium, diisobutylmagnesium, di-sec-butylmagnesium, di-tert-butylmagnesium, diamylmagnesium, dineopentylmagnesium, dihexylmagnesium, dicyclohexylmagnesium, methylethylmagnesium, methylpropylmagnesium, methylisopropylmagnesium, methylbutylmagnesium, methylisobutylmagnesium, methyl-sec-butylmagnesium, methyl-tert-butylmagnesium, methylamylmagnesium, methylneopentylmagnesium, methylhexylmagnesium, methylcyclohexylmagnesium, ethylpropylmagnesium, ethylisopropylmagnesium, ethylbutylmagnesium, ethylisobutylmagnesium, ethyl-sec-butylmagnesium, ethyl-tert-butylmagnesium, ethylamylmagnesium, ethylneopentylmagnesium, ethylhexylmagnesium, ethylcyclohexylmagnesium, propylisopropylmagnesium, propylbutylmagnesium, propylisobutylmagnesium, propyl-sec-butylmagnesium, propyl-tert-butylmagnesium, propylamylmagnesium, propylneopentylmagnesium, propylhexylmagnesium, propylcyclohexylmagnesium, isopropylbutylmagnesium, isopropylisobutylmagnesium, isopropyl-sec-butylmagnesium, isopropyl-tert-butylmagnesium, isopropylamylmagnesium, isopropylneopentylmagnesium, isopropylhexylmagnesium, isopropylcyclohexylmagnesium, butylisobutylmagnesium, butyl-sec-butylmagnesium, butyl-tert-butylmagnesium, butylamylmagnesium, butylneopentylmagnesium, butylhexylmagnesium, butylcyclohexylmagnesium, isobutyl-sec-butylmagnesium, isobutyl-tert-butylmagnesium, isobutylamylmagnesium, isobutylneopentylmagnesium, isobutylhexylmagnesium, isobutylcyclohexylmagnesium, sec-butyl-tert-butylmagnesium, sec-butylamylmagnesium, sec-butylneopentylmagnesium, sec-butylhexylmagnesium, sec-butylcyclohexylmagensium, tert-butylamylmagnesium, tert-butylneopentylmagnesium, tert-butylhexylmagnesium, tert-butylcyclohexylmagnesium, amylneopentylmagnesium, amylhexylmagnesium, amylcyclohexylmagnesium, neopentylhexylmagnesium, neopentylcyclohexylmagnesium, hexylcyclohexylmagnesium, and the like.

In place of the organomagnesium compound, there may be used hydrocarbon-soluble complexes of the organomagnesium compound with an organometallic compound. This organometallic compound includes, for example, organic compounds of Li, Be, B, Al and Zn.

The organometallic compound in which Me is Al includes trialkylaluminums such as trimethylaluminum, triethylaluminum, tripropylaluminum, triisobutylaluminum, trihexylaluminum, trioctylaluminum, tridecylaluminum, and the like; dialkylaluminum hydrides such as dimethylaluminum hydride, diethylaluminum hydride, dipropylaluminum hydride, diisobutylaluminum hydride, dihexylaluminum hydride, dioctylaluminum hydride, didecylaluminum hydride and the like; alkoxyalkylaluminum hydrides such as methoxymethylaluminum hydride, methoxyethylaluminum hydride, methoxyisobutylaluminum hydride, ethoxyhexylaluminum hydride, ethoxyoctylaluminum hydride, ethoxydecylaluminum hydride and the like; alkylaluminum alkoxides such as dimethylaluminum methoxide, methylaluminum dimethoxide, diethylaluminum methoxide, ethylaluminum dimethoxide, diisobutylaluminum methoxide, isobutylaluminum dimethoxide, dihexylaluminum methoxide, hexylaluminum dimethoxide, dimethylaluminum ethoxide, methylaluminum diethoxide, diethylaluminum ethoxide, ethylaluminum diethoxide, diisobutylaluminum ethoxide, isobutylaluminum diethoxide and the like; etc.

Among these compounds, from the viewpoint of catalyst activity, trialkylaluminum compounds which corresponds to m being 3 in the general formula $MeR^4_m Z^2_n$, are preferred, such as trimethylaluminum, triethylaluminum, tripropylaluminum, triisobutylaluminum, trihexylaluminum, trioctylaluminum, tridecylaluminum and the like. However, these compounds are not limitative but merely illustrative.

The aluminoxanes represented by the general formula —[Al($R^5$)—O]$_p$— includes specifically tetramethyldialuminoxane, tetraethyldialuminoxane, tetrabutyldialuminoxane, tetrahexyldialuminoxane, methylaluminoxane, ethylaluminoxane, butylaluminoxane, hexylaluminoxane and the like.

Among the above organometallic compounds, more preferable are organomagnesium compounds and organoaluminum compounds.

In this invention, the organoaluminum compound (B) which is one of the catalyst components may be a known organoaluminum compound. The organoaluminum compound (B) includes, for example, (B1) organoaluminum compounds represented by the general formula $R^3_a AlZ^1_{3-a}$ and (B2) chain-like or cyclic aluminoxanes having a structure represented by the general formula —[Al($R^6$)O]$_b$—. The organoaluminum compound (B) is preferably the organoaluminum compound (B1) represented by the general formula $R^3_a AlZ^1_{3-a}$. In the above general formulas, $R^3$ and $R^6$ are hydrocarbon groups having 1 to 20 carbon atoms, preferably 1 to 10 carbon atoms, $Z^1$ is a hydrogen atom and/or an alkoxy group; a is a number satisfying $0 < a \leq 3$; and b is an integer of 1 or more, preferably 2 to 30.

The organoaluminum compound (B1) represented by the general formula $R^3_a AlZ^1_{3-a}$ includes trialkylaluminums such as trimethylaluminum, triethylaluminum, tripropylaluminum, triisobutylaluminum, trihexylaluminum, trioctylaluminum, tridecylaluminum and the like; dialkylaluminum hydrides such as dimethylaluminum hydride, diethylaluminum hydride, dipropylaluminum hydride, diisobutylaluminum hydride, dihexylaluminum hydride, dioctylaluminum hydride, didecylaluminum hydride and the like; alkoxyalkylaluminum hydrides such as methoxymethylaluminum hydride, methoxyethylaluminum hydride, methoxyisobutylaluminum hydride, ethoxyhexylaluminum hydride, ethoxyoctylaluminum hydride, ethoxydecylaluminum hydride and the like; alkylaluminum alkoxides such as dimethylaluminum methoxide, methylaluminum dimethoxide, diethylaluminum methoxide, ethylaluminum dimethoxide, diisobutylaluminum methoxide, isobutylaluminum dimethoxide, dihexylaluminum methoxide, hexylaluminum dimethoxide, dimethylaluminum ethoxide, methylaluminum diethoxide, diethylaluminum ethoxide, ethylaluminum diethoxide, diisobutylaluminum ethoxide, isobutylaluminum diethoxide and the like; etc.

Among these compounds, preferred from the viewpoint of catalyst activity are trialkylaluminum compounds which correspond to a being 3 in the general formula $R^3_a AlZ^1_{3-a}$ such as trimethylaluminum, triethylaluminum, tripropylaluminum, triisobutylaluminum, trihexylaluminum and the like. However, these compounds are not limitative but merely illustrative.

The aluminoxane (B2) having a structure represented by the general formula —[Al($R^6$)-O]$_b$— includes tetramethyldialuminoxane, tetraethyldialuminoxane, tetrabutyldialuminoxane, tetrahexyldialuminoxane, methylaluminoxane, ethylaluminoxane, butylaluminoxane, hexylaluminoxane and the like.

The component (B) is usually used in a wide proportion of 0.01–10,000 moles per mole of the titanium atom of the component (A), and preferably in the range of 0.05–500 moles, more preferably 0.1–50 moles, per mole of the titanium atom of the component (A).

The synthesis of the reaction product (A) in this invention is explained below.

The reaction product which is one of the catalyst components of this invention can be prepared by reacting the titanium compound (A1) with the organometallic compound (A2). When solids are contained in the resulting reaction product, it is preferable to use the reaction product in the slurry state or only a liquid obtained by removing the solids from the reaction product, for the polymerization, because the solids formed are very low in catalyst activity as compared with the liquid component and the composition distribution of the copolymer obtained becomes broad. Accordingly, the use of only the solids is not desired.

The reaction of the titanium compound (A1) with the organometallic compound (A2) may be effected by either adding the organometallic compound (A2) to the titanium compound (A1) or conversely adding the titanium compound (A1) to the organometallic compound (A2).

The reaction temperature is preferably $-50°$ to $230°$ C., and the reaction time is not critical.

The amount of the organometallic compound (A2) used is preferably 0.01–1,000, more preferably 0.05–100 and most preferably 0.1–10 in terms of atomic ratio of the metal of the organometallic compound (A2) to the titanium of the titanium compound (A1).

The above-mentioned catalyst components and catalyst are used in the preparation of ethylene homopolymer or copolymer of ethylene and at least one α-olefin.

The α-olefin includes specifically α-olefins having 3 to 30 carbon atoms such as propylene, butene-1, pentene-1, hexene-1, 4-methylpentene-1, octene-1, decene-1, octadecene-1, eicosene-1 and the like.

In order to improve the vulcanizability of the copolymer, a diene may be copolymerized. Such diene includes specifically 1,3-butadiene, dicyclopentadiene, tricyclopentadiene, 5-methyl-2,5-norbornadiene, 5-methylene-2-norbornene, 5-ethylidene-2-norbornene, 5-isopropenyl-2-norbornene, 5-(2'-butenyl)-2-norbornene, 1,5,9-cyclododecatriene, 6-methyl-4,7,8,9-tetrahydroindene, trans-1,2-divinylcyclobutane, 1,4-hexadiene, 4-methyl-1,4-hexadiene, 1,3-hexadiene, 1,6-octadiene, 6-methyl-1,5-heptadiene and the like.

The copolymer obtained by the process of this invention has a density falling within the range of 0.85–0.95 g/cm$^3$, preferably 0.88–0.95 g/cm$^3$, more preferably 0.90–0.95 g/cm$^3$.

The polymerization conditions used in this invention are such that the temperature is 120° C. or more, preferably 120°–350° C. more preferably 150°–280° C., and the pressure is 350 kg/cm$^2$ or more, preferably 350–3,500 kg/cm$^2$, more preferably 600–1,800 kg/cm$^2$. The polymerization system may be either batchwise system or continuous system, and the continuous system is preferred.

As a reactor, a stirring type tank form reactor or a tube form reactor is used. The polymerization may be effected in a single reaction zone; however, the reactor may be divided into plural reaction zones or plural reactors may be connected in series or parallel. When a plural of reactors are used, either tank form-tank form combination or tank form-tube form combination may be used. In the polymerization in plural reaction zones or plural reactors, it is possible to produce polymers having different characteristics by independently controlling the temperature, pressure and gas composition in each reaction zone or reactor.

As to the introduction of each catalyst component into a polymerization vessel, it is necessary to introduce the component in the moisture-free state in an inert gas such as nitrogen, argon or the like, and there are no other particular conditions which should be limited. The catalyst components (A) and (B) may be fed separately or may be previously contacted with each other and then fed. In order to control the molecular weight of the copolymer to be produced in this invention, it is possible to add a chain-transfer agent such as hydrogen or the like.

According to this invention, it is possible to produce an ethylene polymer or ethylene-α-olefin copolymer having a narrow composition distribution and a high molecular weight, and there is provided an ethylene polymer or ethylene-α-olefin copolymer excellent in weather resistance, color development, transparency, corrosiveness and mechanical properties, particularly in transparency.

This invention is further explained in more detail below referring to Examples and Comparative Examples which are merely by way of illustration and not by way of limitation.

Incidentally, the properties of the polymers in the Examples were measured according to the following methods:

Melt flow rate (MFR): According to ASTM 1238-57T

Density: According to JIS K-6760

Haze: According to ASTM D1003

The haze is an indication of transparency of film and the lower the haze, the better the transparency of film.

EXAMPLE 1

(1) Synthesis of titanium compound (A1)

A 3-liter flask equipped with a stirrer, a dropping funnel and a thermometer was purged with argon, and then charged with 181 ml (600 millimoles) of dioctylamine and 1.5 liters of hexane.

Subsequently, 387 ml (600 millimoles) of butyllithium diluted with hexane was dropwise added through the dropping funnel to the solution in the flask in 30 minutes while the temperature of the solution in the flask was kept at 5° C. After completion of the dropwise addition, the resulting mixture was subjected to reaction at 5° C. for 2 hours and further at 30° C. for 2 hours.

Subsequently, 16.5 ml (150 millimoles) of $TiCl_4$ diluted with hexane was dropwise added through the dropping funnel to the reaction mixture in 30 minutes while the temperature was kept at 5° C. After completion of the dropwise addition, the resulting mixture was subjected to reaction at 5° C. for 1 hour and further at 30° C. for 2 hours to obtain 150 millimoles of a titanium compound (A1) represented by the composition formula $[(C_8H_{17})_2N]_4Ti$.

(2) Reaction of titanium compound (A1) with organometallic compound (A2)

To the above titanium compound was added 300 ml (300 millimoles) of triethylaluminum diluted with heptane, and the resulting mixture was subjected to reaction for 1 hour while the temperature was kept at 30° C., to obtain 105 millimoles of a reaction product (A) [referred to hereinafter as the catalyst component (A)] (the catalyst concentration was 0.062 mmol of Ti/ml).

(3) Polymerization of ethylene

Into a 1-liter autoclave type continuous reaction vessel provided with a stirrer were charged 41 mole % of butene-1 as a comonomer and 0.5 mole % of hydrogen, and triethylaluminum and the catalyst component (A) were fed thereto as a catalyst so that Al/Ti (atomic ratio) became 1.3, after which ethylene and butene-1 were subjected to copolymerization under the conditions that the polymerization temperature was 210° C., the polymerization pressure was 800 $kg/cm^2$: and the polymerization residence time was 45 seconds.

(4) Formation and evaluation of film

The copolymer thus obtained was molded into a film through a T die under the following conditions, and the physical properties of the film thus obtained were evaluated. The results obtained are shown in Table 1.

Apparatus: 50 mm φ extruder (600-V50 model manufactured by Tanabe Plastic)

Die: 400 mm in width, 0.7 mm in lip clearance

Molding temp.: 240° C.

Extrusion rate: 10 kg/hr

Drawing speed: 9.5 m/min

Chill roll temp.: 50° C.

Film thickness: 60μ

EXAMPLE 2

(1) Synthesis of titanium compound (A1)

A 3-liter flask equipped with a stirrer, a dropping funnel and a thermometer was purged with argon, and then charged with 181 ml (600 millimoles) of dioctylamine and 1.5 liters of hexane.

Subsequently, 387 ml (600 millimoles) of butyllithium diluted with hexane was dropwise added through the dropping funnel to the solution in the flask in 30 minutes while the temperature of the solution in the flask was kept at 5° C. After completion of the dropwise addition, the resulting mixture was subjected to reaction at 5° C. for 2 hours and further at 30° C. for 2 hours.

Subsequently, 22.0 ml (200 millimoles) of $TiCl_4$ diluted with hexane was dropwise added through the dropping funnel to the reaction mixture in 30 minutes while the temperature was kept at 5° C. After completion of the addition, the resulting mixture was subjected to reaction at 5° C. for 1 hour and further at 30° C. for 2 hours to obtain 200 millimoles of a titanium compound (A1) represented by the composition formula $[(C_8H_{17})_2N]_3TiCl$.

(2) Reaction of titanium compound (A1) with organometallic compound (A2)

To the above titanium compound was added 370 ml (200 millimoles) of MAGALA 7.5E manufactured by Tosoh-Akzo [composition formula: $7.5(n-C_4H_9)_2Mg \cdot (C_2H_5)_3Al$] diluted with heptane, and the resulting mixture was subjected to reaction for 1 hour while the temperature was kept at 30° C., to obtain 200 millimoles of a reaction product (A) [referred to hereinafter as the catalyst component (A)] (the catalyst concentration was 0.081 mmol of Ti/ml).

(3) Polymerization of ethylene

Into a 1-liter autoclave type continuous reaction vessel provided with a stirrer were charged 39 mole % of butene-1 as a comonomer and 0.4 mole % of hydrogen, and triethylaluminum and the catalyst component (A) were fed thereto as a catalyst so that Al/Ti (atomic ratio) became 2.5, after which ethylene and butene-1 were subjected to copolymerization under the conditions that the polymerization temperature was 210° C., the polymerization pressure was 800 kg/cm² and the polymerization residence time was 45 sec.

(4) Formation of film

In the same manner as in Example 1 (4), a film was prepared using the copolymer thus obtained. The results obtained are shown in Table 1.

COMPARATIVE EXAMPLE 1

(1) Preparation of solid catalyst component (C)

To ball mill treatment were subjected 100 g of commercially available anhydrous magnesium chloride and 100 g of TAC-131 (TiCl$_3$.1/3 AlCl$_3$) manufactured by Toho Titanium for 40 hours to prepare a solid catalyst component (C). This powder was analyzed to find that it contained 10.9% of Ti, 1.3% of Al, 74.6% of Cl, 12.0% of Mg (all by weight).

(2) Preparation of catalyst dispersion

In a 10-liter tank sufficiently purged with nitrogen was placed 7 liters of heptane, and further 14 millimoles of triethylaluminum and 7 g of the solid catalyst component (C) obtained in (1) above were placed therein. Subsequently, 315 g of hexene-1 was added to the resulting mixture and the stirring was continued to obtain a viscous, solid catalyst dispersion.

(3) Polymerization of ethylene

Into a 1-liter autoclave type continuous reaction vessel were charged 16 mole % of butene-1 as a comonomer and 0.04% of hydrogen, and triethylaluminum and the above solid catalyst dispersion were fed thereto as a catalyst so that Al/Ti (atomic ratio) became 4.0, after which ethylene and butene-1 were copolymerized under the conditions that the polymerization temperature was 237° C. the polymerization pressure was 800 kg/cm² and the polymerization residence time was 45 seconds.

(4) Formation of film

In the same manner as in Example 1 (4), a film was prepared using the copolymer obtained in (3) above. The results obtained are shown in Table 1.

TABLE 1

| | MFR g/10 min | Density g/cm³ | Physical properties of film Haze (%) |
|---|---|---|---|
| Example 1 | 2.6 | 0.9359 | 4.8 |
| Example 2 | 1.7 | 0.9349 | 5.1 |
| Comparative Example 1 | 3.0 | 0.9350 | 10.1 |

What is claimed is:

1. A process for polymerizing ethylene at a high temperature under high pressure, which comprises contacting ethylene alone or along with an α-olefin at a temperature of 120° C. or more at a pressure of 350 kg/cm² or more with a catalyst consisting essentially of (A) a previously mutually contacted product of (A1) a titanium compound having at least one titanium-nitrogen bond with (A2) an organomagnesium compound and (B) an organoaluminum compound represented by the general formula $R^3_a AlZ^1_{3-a}$ wherein $R^3$ represents a hydrocarbon group having 1 to 20 carbon atoms: $Z^1$ represents at least one member selected from the group consisting of hydrogen atom and alkoxy group; and a represents a number satisfying 0<a≦3.

2. The process according to claim 1, wherein the titanium compound having at least one titanium-nitrogen bond (A1) is a titanium compound represented by the general formula $(R^1R^2N)_{4-(m+n)}TiX_mY_n$ [$R^1$ and $R^2$ represent hydrocarbon groups having 1 to 30 carbon atoms and may be the same or different; X represents a halogen atom; Y represents an alkoxy group, m is a number satisfying 0≦m≦3, n is a number satisfying 0≦n≦3; and (m+n) is a value satisfying 0≦(m+n)≦3].

3. The process according to claim 2, wherein $R^1$ and $R^2$ represent aliphatic hydrocarbon groups.

4. The process according to claim 3, wherein the aliphatic hydrocarbon groups have 8 to 30 carbon atoms.

5. The process according to claim 3, wherein m represents 0 or 2.

6. The process according to claim 1, wherein $R^3$ is a hydrocarbon group having 1 to 10 carbon atoms.

7. The process according to claim 1, wherein a is 3.

8. The process according to claim 1, wherein the temperature is 120°–350° C. and the pressure is 350–3,500 kg/cm².

9. The process according to claim 1, wherein the temperature is 150°–280° C.

10. The process according to claim 1, wherein the pressure is 600–1,800 kg/cm².

11. The process according to claim 1, wherein the component (B) is used in a proportion of 0.01–10,000 moles per mole of titanium atom of the component (A).

12. The process according to claim 1, wherein the α-olefin is propylene, butene-1, pentene-1, hexene-1, 4-methylpentene-1, octene-1, decene-1, octadecene-1 or eicosene-1.

* * * * *